US012585601B2

(12) United States Patent
Etaungo Esteves et al.

(10) Patent No.: US 12,585,601 B2
(45) Date of Patent: Mar. 24, 2026

(54) EVENT DRIVEN HIGH SPEED INTERFACE COUNTER POLLING

(71) Applicant: Arista Networks, Inc., Santa Clara, CA (US)

(72) Inventors: Jefferson Alberto Etaungo Esteves, Lisbon (PT); Dhruvalkumar Patel, Nashua, NH (US); Scott Joseph Smith, Arlington, MA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 18/817,511

(22) Filed: Aug. 28, 2024

(65) Prior Publication Data

US 2026/0064613 A1     Mar. 5, 2026

(51) Int. Cl.
*G06F 13/40* (2006.01)
*G06F 13/38* (2006.01)

(52) U.S. Cl.
CPC .......... *G06F 13/38* (2013.01); *G06F 2213/40* (2013.01)

(58) Field of Classification Search
CPC ............................ G06F 13/38; G06F 2213/40
See application file for complete search history.

(56) References Cited

U.S. PATENT DOCUMENTS

| | | | |
|---|---|---|---|
| 10,198,382 B2 * | 2/2019 | Danis .................. | G06F 13/4282 |
| 11,422,962 B2 * | 8/2022 | Green .............. | H04L 12/40195 |
| 2020/0218652 A1 * | 7/2020 | Huang .................. | G06F 3/0659 |
| 2021/0326288 A1 * | 10/2021 | Kee ..................... | G06F 13/1668 |

* cited by examiner

*Primary Examiner* — Henry Tsai
*Assistant Examiner* — Christopher A Daley
(74) *Attorney, Agent, or Firm* — Tianyi He

(57) ABSTRACT

Techniques for enabling precision monitoring of one or more data-throughput counters at one or more network interfaces are disclosed. A command-batch based polling technique enables a system to monitor with precision, e.g., at a high-speed, data-packet traffic through one or more data ports at a network interface. The command-batch based polling technique may enable polling of data-throughput counters for the data ports at the network interface every 1 ms, 10 ms, or 100 ms to monitor the high-speed flow of data-packet traffic through the data ports without loss of count data from overwriting.

20 Claims, 6 Drawing Sheets

FIG. 1A       100
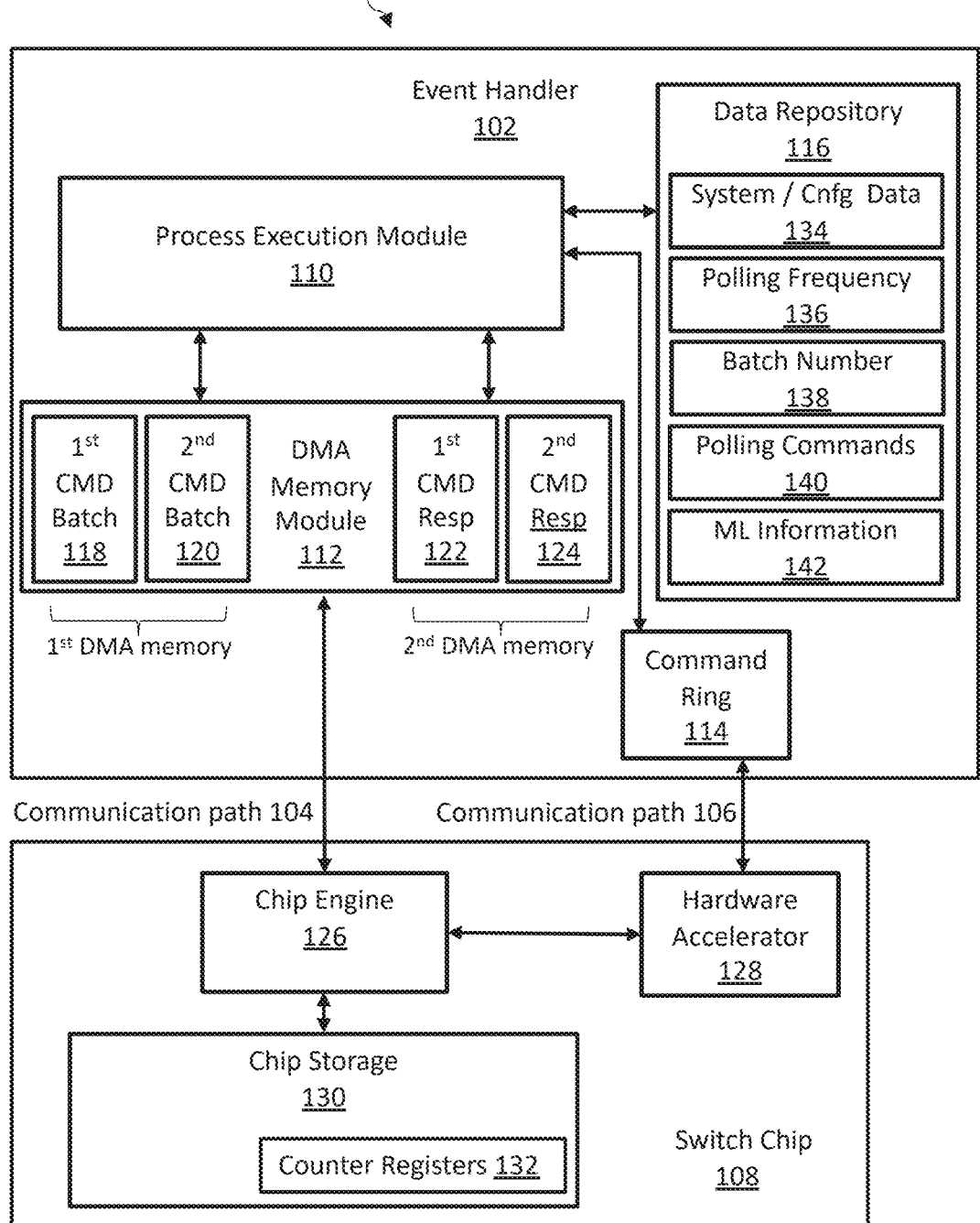

FIG. 1B     100
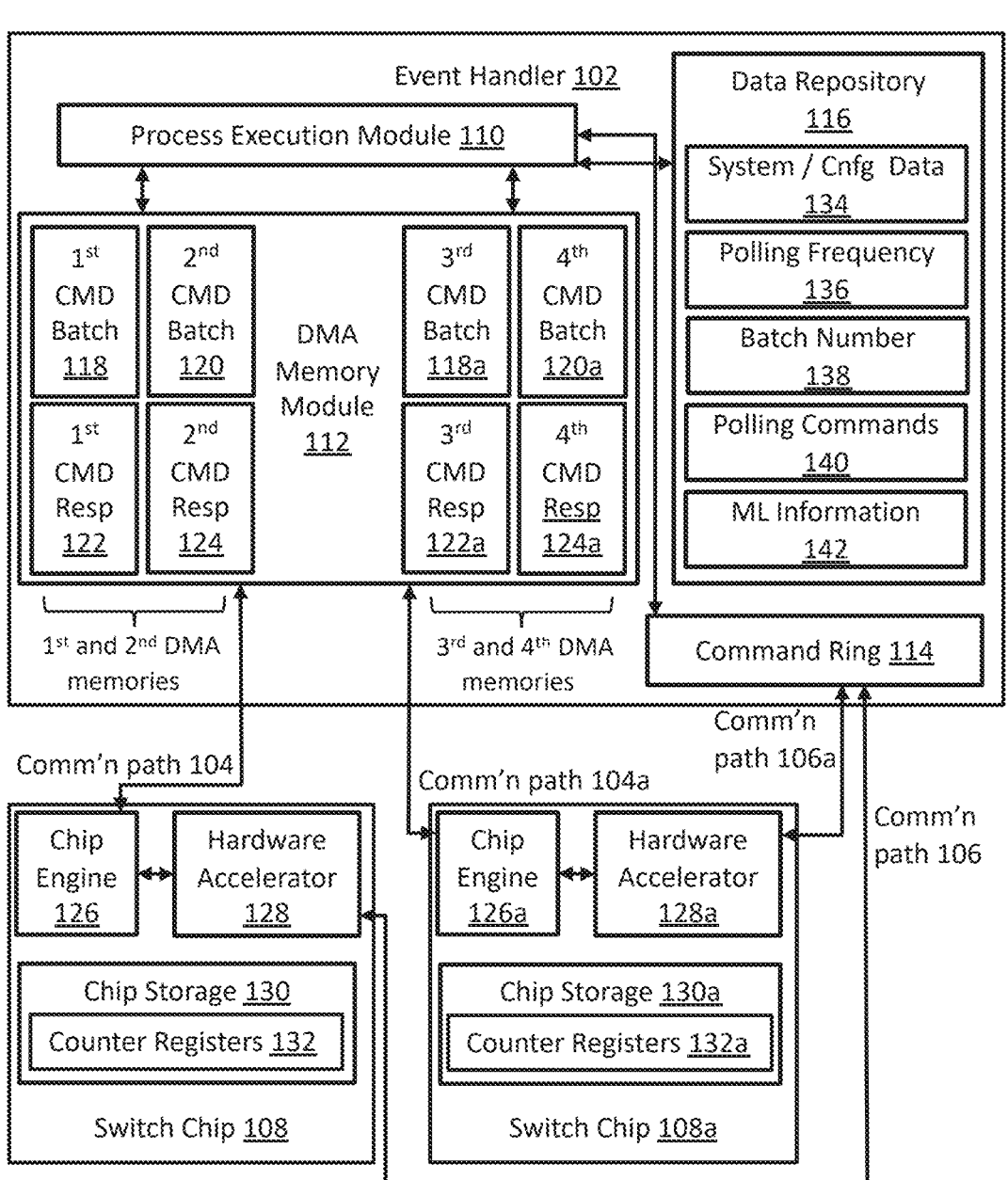

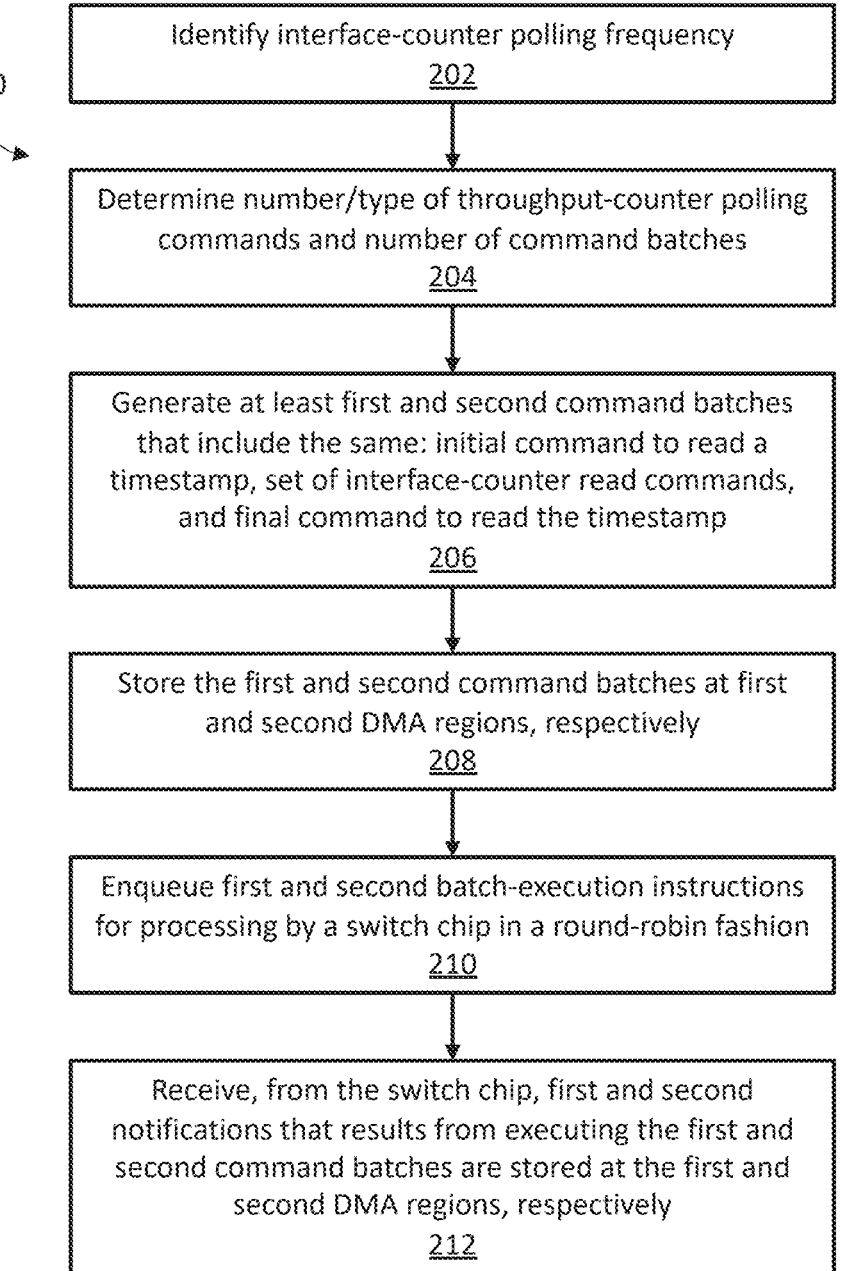

200

Identify interface-counter polling frequency
202

Determine number/type of throughput-counter polling
commands and number of command batches
204

Generate at least first and second command batches
that include the same: initial command to read a
timestamp, set of interface-counter read commands,
and final command to read the timestamp
206

Store the first and second command batches at first
and second DMA regions, respectively
208

Enqueue first and second batch-execution instructions
for processing by a switch chip in a round-robin fashion
210

Receive, from the switch chip, first and second
notifications that results from executing the first and
second command batches are stored at the first and
second DMA regions, respectively
212

FIG. 2

DISPLAY 412

INPUT DEVICE 414

CURSOR CONTROL 416

MAIN MEMORY 406

ROM 408

STORAGE DEVICE 410

BUS 402

PROCESSOR 404

COMMUNICATION INTERFACE 418

400

NETWORK LINK 420

428

INTERNET

ISP

426

SERVER 430

LOCAL NETWORK 422

HOST 424

EVENT DRIVEN HIGH SPEED INTERFACE COUNTER POLLING

TECHNICAL FIELD

The present disclosure relates to a computer-implemented technique for monitoring an amount of data flowing through a network interface.

BACKGROUND

An interface counter tracks a number of packets transmitted to and from a corresponding interface. A system may execute a command batch including a set of commands to poll a set of interface counters. The output of the set of commands in the command batch is stored at an associated memory location that is identified by or associated with the system or the set of commands.

The approaches described in this section are approaches that could be pursued, but not necessarily approaches that have been previously conceived or pursued. Therefore, unless otherwise indicated, it should not be assumed that any of the content or approaches described in this section qualify as prior art merely by virtue of their inclusion in this section.

BRIEF DESCRIPTION OF THE DRAWINGS

The embodiments of this disclosure are illustrated by way of example and not by way of limitation in the figures of the accompanying drawings. It should be noted that references to "an" or "one" embodiment of the disclosure in this disclosure are not necessarily to the same embodiment of the disclosure, and they mean at least one. In the drawings:

FIG. 1A illustrates an operating environment including an event handler and a switch chip configured to monitor data-throughput at a network interface in accordance with one or more embodiments of the disclosure;

FIG. 1B illustrates an operating environment including an event handler and switch chips configured to monitor data-throughput at network interfaces in accordance with one or more embodiments of the disclosure;

FIG. 2 shows an example set of operations for precision monitoring one or more data-throughput counters in accordance with one or more embodiments of the disclosure;

DETAILED DESCRIPTION

Figure 3A:
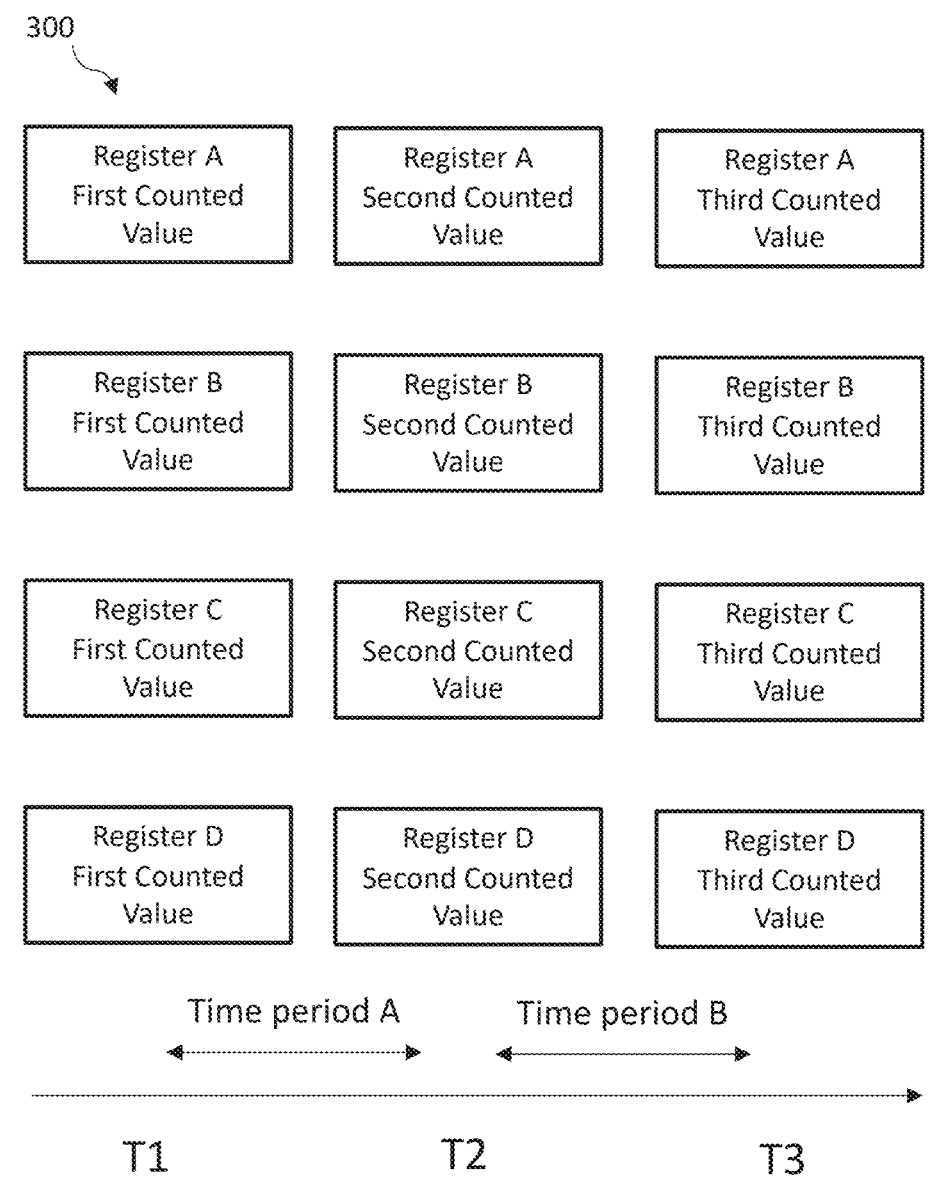
FIGS. 3A and 3B depict an example precision monitoring technique in accordance with one or more embodiments of the disclosure.

In the following description, for the purposes of explanation, numerous specific details are set forth in order to provide a thorough understanding of the disclosure. One or more embodiments of the disclosure may be practiced without these specific details. Features described in one embodiment of the disclosure may be combined with features described in a different embodiment of the disclosure. In some examples, well-known structures and devices are described with reference to a block diagram form in order to avoid unnecessarily obscuring the scope of the disclosure.

1. GENERAL OVERVIEW
2. NETWORK INTERFACE MONITORING SYSTEM
3. POLLING A COUNTER USING MULTIPLE COMMAND BATCHES

4. EXAMPLE EMBODIMENT
5. HARDWARE OVERVIEW
6. MISCELLANEOUS; EXTENSIONS

1. GENERAL OVERVIEW

In accordance with one of multiple aspects of the disclosure, a command-batch based polling technique facilitates precision monitoring of one or more data-throughput counters at one or more network interfaces. In the era of machine learning and artificial intelligence, a large volume of data may be generated and transmitted, e.g., at relatively high speeds, through the one or more network interfaces. In one or more aspects of the disclosure, a group of counter registers at a switch chip includes at least a first register configured to store count values collected from a first data port, e.g., at a network interface, and a second register configured to store count values collected from a second data port, e.g., at a network interface. According to one or more aspects, a hardware timestamp retrieval and storage mechanism may be implemented to provide a process execution module with precise time information concerning when a corresponding set of the count values were obtained from the counter registers at the switch chip. For instance, hardware timestamps may be read, e.g., at a beginning and end of the reading (from the count registers) of the count values, and stored (along with the read count values) at a particular location of memory. Additionally or alternatively, the command-batch based polling technique may enable a system to monitor with precision (e.g., at a high-speed) data-packet traffic through one or more data ports at a network interface. For instance, the command-batch based polling techniques described herein may enable polling of data-throughput counters for the data ports at a network interface every 1 ms or 100 ms, e.g., every 1 ms to 10 ms, to monitor the high-speed flow of data-packet traffic through the one or more data ports, e.g., without loss of data such as count values from overwriting.

The precision monitoring of the data-packet traffic through the one or more data ports at the network interface (s) may enable a user to detect, for example, whether the data-packet traffic at the one or more data ports is burst-natured or is continuous. Further, such precision monitoring of the data-packet traffic through the one or more data ports at the network interface(s) may enable a user to detect whether any network load balancing may be required.

According to one or more embodiments, a command-batch based polling technique of the disclosure enables execution of a set of throughput-counter polling commands included in each of one or more command batches. The command-batch based polling technique may be implemented via multiple operations, one of which may in an embodiment comprise: including the (same) set of (identical) throughput-counter polling commands in each of the one or more command batches in order to monitor one or more data-throughput counters. The one or more data-throughput counters may be associated with one or more network interfaces to be monitored with precision. The monitoring may comprise polling the one or more data-throughput counters at a high-speed without command execution results, from execution of the throughput-counter polling commands, being lost, e.g., from early or untimely overwriting.

In accordance with one or more aspects of the disclosure, command-batch execution results from each execution of the set of throughput-counter polling commands are stored at a particular location of memory. A current command-batch execution result may overwrite other, e.g., unread, information that may or may not include a prior command-batch execution result. Accordingly, the output of the prior command-batch execution result may be lost if not read from the location of memory before the output of the current command-batch execution result is stored in the location of memory. According to an aspect of the disclosure, current command-batch execution results generated from executing a command batch are stored, at the location of memory, without overwriting prior command-batch execution results stored at the location of memory (generated from a prior execution of the command batch) before the prior command-batch execution results are read from the location of memory. In other words, the command-batch based polling technique according to the aspect(s) of the disclosure enables the reading of the prior command-batch execution results from the location of memory before current command-batch execution results are stored to the same location of memory. For instance, prior command-batch execution results, e.g., from execution of a particular command batch associated with a particular memory location, may be read from the particular memory location before current command-batch execution results, e.g., from another execution of the particular command batch, are stored to the particular memory location.

Embodiments of the disclosure operate to identify, e.g., select, a target interface-counter polling frequency for polling a group of data-throughput counters, associated with a set of network interfaces, by executing a set of throughput-counter polling commands for each polling instance. A polling setting may be identified, e.g., selected, to indicate or be associated with a number of data-throughput counters and/or number of network interfaces to be polled. A set of particular interfaces, data-throughput counters, polling rate (s), and/or sampling period(s) may be specified by an operator and/or may be selected, e.g., automatically, based on stored specifications and/or selection criteria. Based on the target interface-counter polling frequency (and/or the polling setting), a number n of command batches may be generated for periodic execution. The number n be one, two (as in an illustrated embodiment), or greater than two. Identifying the target interface-counter polling frequency (and/or the polling setting) may correspond to (e.g., be triggered by) detecting, receiving, and/or responding to an event or a condition. For example, high-speed polling may be initiated in response to or based on a packet drop rate satisfying a first polling initiation criterion, a time of day or other temporal metric satisfying a second polling initiation criterion, one or more detected link flapping characteristics satisfying a third polling initiation criterion, and/or a detected quality of service satisfying a fourth polling initiation criterion. One or more embodiments of the disclosure described in this Specification and/or recited in the claims may not be included in this General Overview section.

2. NETWORK INTERFACE MONITORING SYSTEM

According to one or more embodiments of the disclosure, each particular command batch, of the plurality of command batches, is respectively associated with a corresponding memory region such that an output of the set of throughput-counter polling commands in the particular command batch is stored in the corresponding memory region associated with the particular command batch. A first output of a first execution of the set of throughput-counter polling commands in the first command batch, of the plurality of command batches, is stored in a first memory region corresponding to the first command batch. According to an example implementation in which storing the first output may overwrite a second output of a prior execution of the set of throughput-counter polling commands in the first command batch, the second output of the prior execution of the set of throughput-counter polling commands may be read from the first memory region prior to being overwritten by the first output.

Turning to the drawings, FIG. 1A illustrates an operating environment 100 suitable for practicing embodiments of the disclosure. An example of the operating environment 100 includes a combination of hardware and software elements for enabling command-batch based precision monitoring of one or more data-throughput counters associated with one or more network interfaces. The operating environment 100 includes a computing system, that in one or more embodiments may comprise a computer system 400 and/or may comprise at least an event handler 102. In the illustrated embodiment, the event handler 102 is configured to interact with a network-interface data traffic tracker, that may comprise an interface chip or a switch chip 108. In accordance with one or more embodiments, the event handler 102 interacts with the switch chip 108 to perform the command-batch based precision monitoring via high-speed polling of one or more data-throughput counters associated with one or more network interfaces.

As illustrated in FIG. 1A, the event handler 102 comprises a process execution module 110, a memory region such as a DMA memory module 112, a command ring 114, and a data repository 116. While illustrated within the event handler 102, any part of the DMA memory module 112 or command ring 114, for example, may be implemented within any other system component (e.g., user communication device, network management station, or switch chip 108) of the operating environment 100. When implemented within another system component, the other system component may operate to instruct the switch chip 108 to facilitate high speed command-batch based polling of data-throughput counters in accordance with one or more embodiments. In an example implementation, a main processor associated with the event handler 102 and a co-processor associated with the switch chip 108 are both included in a common networking device.

The switch chip 108 in the illustrated embodiment comprises a chip engine 126, a hardware accelerator 128, and a chip storage 130. The chip storage 130 comprises a hardware memory region that may include multiple counter registers 132 in the illustrated embodiment. One or more of the counter registers 132 in turn may include the one or more data-throughput counters corresponding to the one or more network interfaces in the illustrated embodiment. While illustrated within the switch chip 108, any part of the chip storage 130, counter registers 132, or hardware accelerator 128 may be implemented within any other system component (e.g., an interface device, network router, switch, firewall, network address translator, or event handler 102) of the operating environment 100. When implemented within another system component, the other system component operates to facilitate high-speed polling of data-throughput counters in accordance with one or more embodiments.

In the embodiment shown in FIG. 1A, the event handler 102 is configured to communicate with the network-interface data traffic tracker, e.g., the switch chip 108, via one or both of a communication path 104 and a communication path 106. For instance, the event handler 102 may communicate command batches and command-batch execution results with (e.g., to and from, respectively) the switch chip 108 via the communication path 104. Further, the event handler 102 may communicate batch-processing information instructing the switch chip 108 to initiate precision monitoring, e.g., high-speed polling, of the one or more data-throughput counters (e.g., corresponding to the one or more counter registers 132 maintained at the switch chip 104) via the communication path 106. In one or more embodiments, the communication path 104 may comprise a direct Peripheral Component Interconnect (PCI) bus communicatively coupling the DMA memory module 112 to the chip engine 126.

The DMA memory module 112 may be configured to store particular command batches such as a first command batch 118 and a second command batch 120. In accordance with one or more aspects of the disclosure, the DMA-based command batches, e.g., the first command batch 118 and the second command batch 120, may allow for relatively high rate (and precise, due to associated hardware timestamps as described herein) sampling of packet and/or byte counters, e.g., data-throughput counters. The one or more aspects may be implemented in combination with one or more other aspects of the disclosure such as, for example, limiting a sampling period, e.g., as described herein. Additionally or alternatively, the one or more other aspects may include using a circular buffer (cf. command ring 114) technique, e.g., as described herein, to allow for a limited "lookback" window that may be frozen, e.g., preserved, based upon some event.

The DMA memory module 112 may be configured to store the command-batch execution results, such as a first command-batch execution response 122 and a second command-batch execution response 124. In accordance with a particular embodiment of the disclosure, the DMA memory module 112 comprises at least a first DMA memory allocated for storing descriptors, e.g., operations and throughput-counter polling commands, and at least a second DMA memory allocated for storing other content such as data, e.g., command execution responses and results. Accordingly, in the particular embodiment, the (at least one) first DMA memory is configured to store the first command batch 118 and the second command batch 120, while the (at least one) second DMA memory is configured to store the first command-batch execution response 122 and the second command-batch execution response 124.

FIG. 1B illustrates an operating environment corresponding in part to content of FIG. 1A in which like elements are designated with like reference numbers. The operating environment includes an event handler communicatively coupled to two or more network-interface data traffic trackers, e.g., interface chips, configured to monitor data-throughput at two or more network interfaces. According to one or more embodiments of the disclosure, the event handler 102 is configured to interact with the first switch chip 108 via the communication paths 104 and 106 and to interact with a second switch chip 108a via communication paths 104a and 106a. In the illustrated example, the first and second interface chips comprise the first switch chip 108 and the second switch chip 108a that each interact with the event handler 102 to facilitate command-batch based precision monitoring via high-speed polling of data-throughput counters associated with the two or more network interfaces. The command-batch based precision monitoring in the depicted embodiment utilizes (a) the first DMA memory to store the first command batch 118 and the second command batch 120 in association with the first switch chip 108, (b) the second DMA memory to store the first command-batch execution response 122 and the second command-batch execution response 124 in association with the first switch chip 108, (c) a third DMA memory to store a third command batch 118a and a fourth command batch 120a in association with the second switch chip 108a, and (d) a fourth DMA memory to store a third command-batch execution response 122a and a fourth command-batch execution response 124a in association with the second switch chip 108a.

As embodied in one example, the process execution module 110 is configured to determine one or a sequence of throughput-counter polling commands for inclusion in each of a plurality of command batches. The process execution module 110 according to an embodiment is configured to generate at least a portion of the batch-processing information for enqueueing into the command ring 114. The batch-processing information may include, for example, a particular command (e.g., including a command-batch indicator) for instructing execution by the switch chip 108 of a corresponding particular command batch stored at the DMA memory module 112.

The particular command may include one or more of an operation code and an indication of where (e.g., an address) in the DMA memory module 112 to read the particular command batch from. Additionally or alternatively, the particular command may include one or more indications for the chip engine 126 to initiate the retrieval of data, e.g., count values, from the chip storage 130, e.g., counter registers 132. The particular command may further include a particular indication of where (e.g., an address) in the DMA memory module 112 to store results associated with executing the particular command, e.g., reading one or more of the counter registers 132. In a typical embodiment, the particular command comprises the operation code and includes one or more of: the indication (of where to read the particular command batch from), the one or more indications (to initiate the retrieval of the data), and the particular indication (of where to store the results from the retrieval of the data).

The process execution module 110 in certain embodiments is further configured to store the plurality of command batches at the DMA memory module 112 for future reference and execution, by the switch chip 108, a single or multiple times, e.g., for execution as often as indicated or instructed via the batch-processing information communicated to the switch chip 108 via the command ring 114. For instance, the plurality of command batches may be stored at the first DMA memory of the DMA memory module 112 for execution by the chip engine 126 at the switch chip 108. Once generated, command-batch execution results from the execution(s) may be automatically pushed by the chip engine 126 and/or the switch chip 108, e.g., without CPU intervention on the part of the event handler 102, to the second DMA memory of the DMA memory module 112.

Additionally or alternatively, the process execution module 110 may be configured to enqueue particular commands, e.g., that are each for instructing execution of a corresponding command batch at the switch chip 108, into the command ring 114 according to predetermined time intervals. For example, the process execution module 110 may be configured to enqueue particular commands based on one or more event-handler identified time intervals and/or one or more user defined time intervals. The predetermined time interval(s) may be determined at the event handler 102 to be capable of achieving a target interface-counter polling frequency, e.g., corresponding to polling frequency information 136 stored in the data repository 116. For example, the process execution module 110 may be configured to strategically enqueue into the command ring 114 a plurality of commands at equidistant time intervals. Time intervals associated with the plurality of commands, such as a spacing between particular commands, e.g., that each correspond to a command batch, may allow ample time for processing command-batch execution results originating from each completed command batch. For example, the time intervals may allow ample time, e.g., at one or both of the process execution module 110 or other module at the event handler 102, for processing command-batch execution results stored at the second DMA memory of the DMA memory module 112.

First command-batch execution results, e.g., first data including hardware timestamps and count values from the data-throughput counters, may be written to the counter registers 132 during a first time interval, and subsequent second command-batch execution results, e.g., second data similar to the first data, may be written similarly during a second time interval. Here, the first command-batch execution results are in typical implementations retrieved from the DMA memory module 112 prior to overwriting of the first command-batch execution results by the (newly-generated) second command-batch execution results. For example, the process execution module 110 may periodically retrieve (earlier-stored) first command-batch execution results from the second DMA memory of the DMA memory module 112 prior to (newly-generated) second command-batch execution results being written to the second DMA memory. In a particular implementation, multiple copies of a (single) command batch containing throughput-counter polling commands are used (e.g., to generate the first command-batch execution results and the second command-batch execution results). According to the particular implementation, count values from data-throughput counters stored in the counter registers 132 can be repetitively read (polled) at a relatively high frequency, e.g., every 1 ms, 10 ms, or 100 ms, to monitor the high-speed flow of data-packet traffic through the data ports without data loss such as count values from overwriting. For instance, identical command batches (e.g., each with the same set of throughput-counter polling commands) may repetitively read the count values at a rate of about one poll of the counter registers 132 every 1 ms or 5 ms without data loss from overwriting of unsaved first command-batch execution results from the DMA memory module 112.

The retrieving of command-batch execution results from the DMA memory module 112 may be performed by the process execution module 110 according to one or more of: set times or periods, preset times or periods, dynamically determined data-packet traffic, and a predetermined schedule of one or more time intervals. A particular predetermined schedule of time interval(s) may be determined, e.g., at the event handler 102, according to the polling frequency information 136 stored at or accessible by the data repository 116. For example, the process execution module 110 may retrieve the command-batch execution results according to the above-mentioned equidistant time intervals. In one or more embodiments, the first command-batch execution results are transferred from a first memory location, e.g., at the DMA memory module 112, to a second memory location, e.g., at a non-volatile memory at the process execution module 110, prior to the second command-batch execution results being written to the first memory location. In one or more embodiments, the first command-batch execution results, e.g., at the second memory location, are made accessible, e.g., via the process execution module 110, for further analysis. For example, the first command-batch execution results are made accessible to a user device or in response to a user input prior to the second command-batch execution results overwriting the first command-batch execution results. In another example, the first command-batch execution results may be provided, e.g., retrieved from the second memory location and/or pushed, in response to a user input via a Command Line Interface (CLI) or retrieval via user input of a file containing or corresponding to the first command-batch execution results on a storage drive or disk accessible by the event handler 102 prior to overwriting of the first command-batch execution results.

Hence, the event handler 102 in typical embodiments enables processing, e.g., by the process execution module 110 and/or under control of or instruction from a user, of the command-batch execution results originating from each completed command batch. In one or more embodiments, the command-batch execution results are stored at the memory of the process execution module 110 for further analysis.

In one or more example implementations, the DMA memory module 112 may be implemented at the event handler 102 based on allocating the first DMA memory for storage of the command batches (indicating the throughput-counter polling commands) and the second DMA memory for storage of the command-batch execution responses. Implementing the DMA memory module 112 may comprise writing the command batches to the allocated first DMA memory. The DMA memory module 112 may be implemented (e.g., at the event handler 102) based further on writing (e.g., as part of the batch-processing information) particular first-DMA-memory addresses (e.g., of the stored command batches and/or of the throughput-counter polling commands) to the command ring 114.

Following the writing of the first-DMA-memory addresses, the implementation of the DMA memory module 112 may for instance be based further on setting a START bit, e.g., in a COMMAND register associated with the event handler 102 and/or the switch chip 108. The START bit may be configured to indicate, e.g., to the switch chip 108, that one or more command batches (indicating the throughput-counter polling commands) are available at the first DMA memory of the DMA memory module 112 for execution, e.g., by the switch chip 108. Subsequently, according to the one or more example implementations of the DMA memory module 112, a DONE bit is set, e.g., in a STATUS register associated with the event handler 102 and/or the switch chip 108. The DONE bit may be configured to indicate, e.g., to the event handler 102, that command-batch execution results are available at the second DMA memory of the DMA memory module 112, e.g., for reading and processing by the event handler 102.

As embodied herein, the command ring 114 may be configured to store batch-processing information for being communicated to the switch chip 108. The batch-processing information in certain embodiments includes one or more addresses pointing to one or more command batches stored in the DMA memory module 112, e.g., to addresses of one or more command batches and/or throughput-counter polling commands stored at the first DMA memory. The command ring 114 may be configured to operate in a round-robin fashion, e.g., as a round-robin command buffer or queue to manage and/or optimize the execution of command batches issued by the event handler 102. Hence, one or more instances of the batch-processing information may be processed, e.g., by the hardware accelerator 128, in a sequential and/or repetitive (e.g., circular) fashion. For example, the one or more instances of the batch-processing information, e.g., pointers to command batches in the DMA memory module 112, may be processed by the hardware accelerator 128 according to a round-robin algorithm via cycling through the available instances of the batch-processing information one-by-one by the hardware accelerator 128.

The hardware accelerator 128 according to the illustrated embodiment is configured to provide communications between the switch chip 108 and the command ring 114 for performance of at least a portion of the command-batch based polling technique. In a particular implementation, the hardware accelerator 128 communicates with the command ring 114 via the communication path 106 to provide functionality associated with high-speed polling of data-throughput counters corresponding to the counter registers 132. This functionality provided by the hardware accelerator 128 can in certain implementations serve to alleviate a computational burden associated with, e.g., imposed on, the primary CPU of the event handler 102 required for high-speed polling, e.g., including instructing the switch chip 108 to perform operations associated with hardware timestamps. Additionally or alternatively, the functionality may serve to alleviate a computational burden associated with polling the counter registers 132 via throughput-counter polling commands and/or with reading (or writing) from (or to) the DMA memory module 112.

For example, the hardware accelerator 128 may comprise a specialized processing unit configured to detect instructions from the event handler 102 regarding temporal and procedural aspects for implementing the command-batch based polling technique. In particular, the hardware accelerator 128 may be configured to, e.g., in response to the setting of the START bit, read the batch-processing information from the command ring 114. The START bit may, for example, be set by or at the event handler 102, and the batch-processing information may include at least one command enqueued by the process execution module 110 into the command ring 114. The batch-processing information may include an indication, e.g., an address, of a command batch stored at the DMA memory module 112. For instance, the indication may include an address of a first command of a set of commands corresponding to a command batch stored in the first DMA memory at the DMA memory module 112. As embodied in one example, the hardware accelerator may be configured to employ the round-robin algorithm, e.g., to facilitate a consistent order of execution by the switch chip 108 for each of the command batches. In a particular implementation, the hardware accelerator is configured or programmed via software to enqueue/interleave commands in the command ring such that they are executed in a round-robin fashion.

In one or more embodiments, the chip engine 126 may comprise a chip engine interface controller. Additionally or alternatively, the chip engine 126 may comprise functionality or structure configured to facilitate communication with the DMA memory module 112 via the communication path 104, e.g., that may comprise a direct PCI bus coupling. According to some aspects of the disclosure, the chip engine 126 comprises a processor, e.g., co-processor, configured to facilitate and/or assist the event handler 102, e.g., the primary CPU associated with the process execution module 110, in performing high-speed polling of data-throughput counters at one or more network interfaces.

In another particular implementation, the chip engine 126 communicates with the DMA memory module 112 via the communication path 104 to provide DMA functionality used for the high-speed polling (e.g., associated with reading and writing to the DMA memory module 112 as described herein) to further alleviate a computational burden imposed on the primary CPU (i.e., in addition to the burden alleviation provided by the hardware accelerator 128 as described above). For example, the chip engine 126 may provide the DMA functionality by initiating and/or orchestrating transfers of command-batch execution results into the DMA module memory 112, e.g., without or with reduced processing being required by the primary CPU for achieving the functionality, thereby helping to facilitate a relatively seamless (efficient) transfer of command-batch execution results.

In an example embodiment, the chip engine 126 comprises or is configured at least in part to function as a DMA engine communicatively coupled with the communication path 104, the hardware accelerator, and the and the chip storage 130. For instance, the chip engine 126 may be configured to perform operations associated with one or both of the DMA memory module 112 and the chip storage 130, e.g., including the counter registers 132. The chip engine 126 may be configured, for example, to execute at least a portion of command batches stored at the DMA memory module 112, e.g., by accessing the chip storage 130, e.g., including the counter registers 132. In a certain implementation, the chip engine 126 is further configured to signal completion of execution of a particular command batch to the hardware accelerator 128. For example, the signaling may indicate that the chip engine 126 is ready to process an additional command batch, at which point the hardware accelerator 128 may in turn notify the process execution module 110 of a successful execution of the particular command batch.

Each of the one or more data-throughput counters, e.g., of the counter registers 132, may be configured to monitor data-packet traffic activity at a corresponding data port of the one or more network interfaces. The switch chip 108 accordingly is configured to maintain the one or more data-throughput counters corresponding to one or more of the counter registers 132. The event handler 102 accordingly is configured to implement precision monitoring, e.g., high-speed polling, of the one or more data-throughput counters maintained by the switch chip 108 via the communication path 104 and the communication path 106.

In one or more implementations, a group of the counter registers 132 is configured to record a corresponding group of count values, e.g., counts, of data packet ingress and/or data packet egress at data ports associated with one or more network interfaces. For example, a plurality of the counter registers 132 may store count values, e.g., counts, associated with and/or may operate as data-throughput counters for the one or more network interfaces.

In one or more embodiments, the operating environment 100 may include more or fewer components than the components illustrated in FIGS. 1A-1B. The components illustrated in FIGS. 1A-1B may be local to or remote from each other. The components illustrated in FIGS. 1A-1B may be implemented in software and/or hardware. Each component may be distributed over multiple applications and/or machines. Multiple components may be combined into one application and/or machine. Operations described with respect to one component may instead be performed by another component. One of skill in the art will appreciate that the event handler device 102 and the switch chip 108 may take a variety of forms, be represented as multiple components, and communicate with any number of sources referenced herein and other sources.

In addition to being communicatively coupled to the DMA memory module 112 and the command ring 114, the event handler 102 in the illustrated embodiment is further communicatively coupled, e.g., via a wired or wireless network, to the data repository 116. The data repository 116 according to one or more embodiments of the disclosure comprises any type of storage unit and/or device (e.g., a file system, database, collection of tables, or any other storage mechanism) for storing data relevant to interface monitoring operations. Further, the data repository 116 may include multiple different storage units and/or devices; the multiple different storage units and/or devices may or may not be of the same type or located at the same physical site. Further, the data repository 116 may be implemented by, or may execute on, the computing system, e.g., that includes the event handler 102. Alternatively, or additionally, the data repository 116 may be implemented or executed on a system separate from the event handler 102. In certain embodiments, the data repository 116 is populated with or accesses information from a variety of sources and/or systems.

The data repository 116 in accordance with one or more embodiments is configured to store data or to access data including one or more of system/configuration data 134, the polling frequency information 136, batch number information 138, polling command information 140, and machine-learning information 142. As used herein, the system/configuration data 134 may describe, comprise, or reference information relating to configuring and operating the event handler 102 to provide network-interface data-throughput counter polling. For example, the system/configuration data 134 may indicate network monitoring tools and software to collect and analyze network interface statistics and performance metrics, e.g., associated with precision monitoring via high-speed polling of switch data-throughput counters. Such monitoring tools may be installed on or associated with a server or computer within a network associated with the operating environment 100. The system/configuration data 134 may indicate network devices, e.g., routers, switches, firewalls, network address translators, servers, etc., to be associated with the high-speed polling of switch data-throughput counters. Each indication may correspond, for example, to an address or name of the network device, SNMP community strings, or other authentication details. The indicated network devices may include the switch chip 108.

The system/configuration data 134 may further describe, comprise, or reference monitoring templates or policies, e.g., associated with one or more of the network interfaces to be monitored. The templates may specify metrics to be collected, such as data-packet count values as described herein and/or one or more of bandwidth utilization, error rates, packet loss, etc. The system/configuration data 134 may further describe one or more associations of or among specific network interfaces, one or more of the network devices, and the monitoring templates or policies, e.g., indicating to a monitoring tool particular metrics to be collected for particular network interfaces.

It is contemplated that the data repository 116 may store any information that can be stored in a computer-storage device or system, such as user-derived data, computer usable instructions, software applications, or other information. Information stored at the data repository 116 may be implemented across any of components, modules, or elements within the operating environment 100. In the illustrated embodiment, for purposes of clarity and explanation, this information is shown and described as being stored or residing in association with the data repository 116.

As used herein, the polling frequency information 136 may describe, comprise, or reference information indicating the polling of (collecting of data from) an interface or switch device such as the switch chip 108. The polling frequency information 136 may indicate a rate of polling, of data-throughput counters of a network interface, for configuring and operating the event handler 102 to provide particular, e.g., high speed, network-interface data-throughput counter polling without data loss from overwriting. The polling frequency information 136 may be expressed as a frequency or may express a corresponding polling interval in milliseconds (ms) or other time units.

The polling frequency information 136 may be determined, e.g., at the event handler 102, to be capable of enabling the enqueueing of commands to the command ring 114 at preset (e.g., corresponding) time intervals, and retrieval of command-batch execution results according to or corresponding to the time intervals, without data loss from overwriting. In other words, the polling frequency information 136 may include a target interface-counter polling frequency determined to enable the collection of count values from data-throughput counters stored in the counter registers 132, at a relatively high rate, e.g., every 1 ms or 10 ms, without data loss from overwriting.

As used herein, the batch number information 138 may include, for example, information specifying or indicating the number n of command batches to be created, e.g., by the event handler 102, for execution at the switch chip 108 per event and/or per unit of measure (e.g., per polling period, polling interval, polling instance, or other polling metric). In one or more embodiments, the number n of command batches may be determined, e.g., at the event handler 102, based at least partially on the polling frequency information 136, e.g., a determined target interface-counter polling frequency (and/or polling setting). Additionally or alternatively, the number n of command batches may be determined based at least partially on the throughput-counter polling command information 140, e.g., type and number of throughput-counter polling commands to be included in the number n of command batches.

The number n of command batches, e.g., within the batch number information 138, may be determined based on the determined target interface-counter polling frequency (and/or polling setting), to enable, for example, (i) executing by the chip engine 126 of the command batches, e.g., at preset (e.g., corresponding) time intervals, and (ii) retrieval of command-batch execution results, e.g., by the process execution module 110, according to or corresponding to the time intervals, without data loss from overwriting as described herein. Following creation of the number n of command batches, the created command batches may be stored in the DMA memory module 112.

Batch-processing information that includes one or more addresses pointing to the created command batches is enqueued into the command ring 113 for processing by the hardware accelerator 128, e.g., in a round-robin fashion. Hence, the batch number information 138 may specify or indicate a number of command batches to be executed at the chip engine 126, e.g., for each polling instance. In an example implementation, a polling instance may correspond to an iteration in which all command-batch indicators, e.g., addresses pointing to the created command batches, in the command ring 114 are executed or processed once.

As used herein, throughput-counter polling command information 140 may refer to a collection of throughput-counter polling commands. Each of the throughput-counter polling commands may be configured to perform a read operation associated with one or more of the counter registers 132. In a typical embodiment, a plurality of data-throughput counters are associated with the monitoring of one or more network interfaces. The plurality of data-throughput counters may be configured to detect and quantify data-packet traffic associated with a corresponding plurality of data ports at the one or more network interfaces. In an example, each of the plurality of data-throughput counters is configured to count a number of data packet ingress and/or egress through a data port of a corresponding plurality of data ports at a network interface. In another example, a first group of the throughput-counter polling command information 140 is configured to generate count values indicating data packet flow(s) through a corresponding first group of data ports at a first network interface. Additionally or alternatively, a second group of the throughput-counter polling command information 140 may be configured to generate count values indicating data packet flow(s) through a corresponding second group of data ports, e.g., at a second network interface. According to an aspect of the disclosure, one or more interfaces each comprise a set of one or more data-throughput counters, where a count value corresponding to each of the one or more data-throughput counters can be retrieved, e.g., from the chip storage 130, with a corresponding throughput-counter polling command identifying or indicating the particular data-throughput counter.

According to another aspect, the corresponding throughput-counter polling commands are grouped together in a command batch, that is then stored in the DMA memory module 112 for processing by the chip engine 126. Generating a command batch may correspond to or may comprise generating a script, e.g., configured to provide in whole or in part, the functionality of the command batch. In order to enable reading execution results of throughput-counter polling commands prior to being overwritten, one or more embodiments may replicate the throughput-counter polling commands across n command batches, where each command batch is associated with a corresponding memory region. Additionally or alternatively, each command batch may be configured to conduct processing using its own DMA region that is configured for both command storage and response storage. For instance, a dedicated DMA region may be designated for storing a first command batch, e.g., corresponding in content to the first command batch 118, and for storing command-batch execution results for the first command batch, e.g., corresponding in content to the first command-batch execution response 122.

It is contemplated that the data repository 116 may store any information that can be stored in a computer-storage device or system, such as user-derived data, computer usable instructions, software applications, or other information. Information stored at the data repository 116 may be implemented across any of components, modules, or elements within the operating environment 100. In the illustrated embodiment, for purposes of clarity and explanation, this information is shown and described as being stored or residing in association with the data repository 116.

In some embodiments, the data repository 116 may cooperate (e.g., directly or via one or more network communication paths) with other modules or components, for example, to enable the disclosed aspects or in connection with performance of operations described herein. For instance, the other modules or components may include the switch chip 108. As an example, information including one or more of the system/configuration data 134, the polling frequency information 136, the batch number information 138, the polling command information 140, and the machine-learning information 142 may be written to or read from the data repository 116 in connection with cooperating with the other components. As used in this and the above paragraph, cooperation with or by the data depository 116 may include: retrieving data or enabling access to data, creating data or enabling creation of data, and writing data or enabling writing of data at or by the data depository 116. In certain embodiments, the data repository 116 is populated with information from a variety of sources and/or systems.

In one or more embodiments, the machine-learning information 142 may include or be associated with an algorithm, e.g., a machine learning algorithm, such as an algorithm that can be iterated to learn (e.g., via trial and error) a target model f that best maps a set of input variables to an output variable. For example, the machine learning algorithm may be configured based on environment characteristics including the target interface-counter polling frequency. Further, the algorithm, e.g., machine learning algorithm, may be applied to a target set of environment characteristics to determine (e.g., via trial and error) the number n of command batches based on the target interface-counter polling frequency.

In one or more embodiments of the disclosure, by way of review, the operating environment 100 may include more or fewer components than the components illustrated in FIGS. 1A-1B, local to or remote from each other, implemented in software and/or hardware. Each component may be distributed over multiple applications and/or machines, and multiple components may be combined into one application and/or machine. Operations described with respect to one component may instead be performed by another component. Additional embodiments of the disclosure and/or examples relating to computer networks are described below in Sections 5 and 6 entitled "Hardware Overview" and "Miscellaneous; Extensions," respectively.

3. POLLING A COUNTER USING MULTIPLE COMMAND BATCHES

FIG. 2 illustrates an example set of operations for enabling high-speed polling of one or more data-throughput counters, using a plurality of command batches in accordance with one or more implementations. One or more operations illustrated in FIG. 2 may be modified, rearranged, or omitted altogether. Accordingly, the particular sequence of operations illustrated in FIG. 2 should not be construed as limiting the scope of one or more implementations of the disclosure.

The operations may be performed in the operating environment 100, e.g., at the event handler 102, to enable precision monitoring of one or more data-throughput counters at a network interface in accordance with one or more implementations of the disclosure. In certain implementations of the disclosure, all or portions of one or more of the operations may correspond to, e.g., be performed by, hardware and/or software configured to perform all or portions of the operations.

One or more implementations of the disclosure operate to identify a target interface-counter polling frequency (and/or polling setting) at Operation 202. For instance, a target interface-counter polling frequency may be determined, e.g., at the event handler 102 or process execution module 110, based on one or more of a user input, a device or system input or event, or the system/configuration data 134. In one or more implementations, a respective target interface-counter polling frequency may be identified for executing each particular command batch based on the target interface-counter polling frequency, and/or each particular command batch may be executed in accordance with the respective target interface-counter polling frequency for the particular command batch. The target interface-counter polling frequency (and/or polling setting) may be associated with or correspond to the polling frequency information 136. The target interface-counter polling frequency in typical implementations is identified for use in connection with (a) polling a group of devices, such as a set of data-throughput counters associated with a network interface, (b) by executing a set of throughput-counter polling commands for each polling instance.

Additionally or alternatively, identifying a target interface-counter polling frequency (and/or polling setting) at Operation 202 may correspond to (e.g., be triggered by) detecting, receiving, and/or responding to an event or a condition. For instance, a high-speed polling mechanism may be initiated either in response to external events occurring within a user network or upon explicit issuance of a Command Line Interface (CLI) command. For instance, the high-speed polling mechanism may be configured to swiftly respond to sundry event scenarios and/or to respond to user-driven commands. The high-speed polling may be performed, e.g., based on internal events, to perform continuous high-speed polling. For example, the high-speed polling mechanism may remain the same but instead of waiting for external events to start polling, the polling may be initiated immediately, e.g., without detecting one or more of the external events.

In an example, based on detecting, receiving, and/or responding to the event or condition, polling may be initiated, e.g., at an identified, specified, or default interface-counter polling frequency. The event or condition may comprise, correspond to, be met in response to a determination corresponding to, or be based on one or more of: (i) a packet drop rate satisfying a first polling initiation criterion, (ii) a time of day, a day of week, or date satisfying a second polling initiation criterion, (iii) one or more detected link flapping characteristics satisfying a third polling initiation criterion, and/or (iv) a detected quality of service satisfying a fourth polling initiation criterion. In a further example, or continuing with the example, detecting, receiving, and/or responding to the event or condition may cause (e.g., result in or be followed by initiation of) changing or adjusting a current, in-process, set, scheduled, or default: polling process (e.g., of a particular set of the counter registers 132) or polling setting, e.g., polling metric (such as polling period), polling paradigm (such as polling schedule), or polling parameter (such as an interface-counter polling frequency or target interface-counter polling frequency).

Based on, for example, the interface-counter polling frequency, a number and/or type of throughput-counter polling commands/command batches are determined (Operation 204). For instance, a set of throughput-counter polling commands may be determined. Additionally or alternatively, a number n of command batches may be determined. The number n of command batches may be determined or adjusted based on an amount of time for a single execution of a set of commands and/or based on an amount of time between executions of a pair of command batches, e.g., that each include the set of commands. An interface-counter polling period of about 2.5 ms may correspond to (a) the number n of command batches, e.g., that each poll a set of counter registers once, being determined to be 2, (b) the amount of time for execution of each command batch being about 2 ms, and (c) the amount of time between executions of the command batches being about 1 ms.

The throughput-counter polling commands and/or command batches may be determined, e.g., at the event handler

102 or process execution module 110, based on one or more of user input data, device or system input or event data, the system/configuration data 134, and the polling frequency information 136. The throughput-counter polling commands and command batches in typical implementations are identified for use in connection with polling set of the counter registers 132, e.g., by executing the number n of command batches for each polling instance. The number n of command batches, e.g., within the batch number information 138, may indicate or correspond to, for example, a group of command batches to be executed at the switch chip 108 per event and/or per unit of measure, e.g., per polling period, polling interval, polling instance, or other polling metric.

In an example implementation of Operation 204, the event handler 102 selects the number n of command batches and a respective frequency for execution of each of the command batches such that the overall execution frequency for the set of throughput-counter polling commands, across the n command batches, meets the target interface-counter polling frequency. Additionally or alternatively, the number n of command batches and respective frequency for execution of each of the command batches is/are selected such that there is sufficient time between executions of the set of throughput-counter polling commands in a same command batch. For instance, the time between executions of the set of throughput-counter polling commands in a same command batch may be sufficient to allow for reading of an output of a prior execution of the set of throughput-counter polling commands prior to the output being overwritten by an output of a current execution of the set of throughput-counter polling commands.

In one or more particular embodiments, a determination of the number n of command batches based on a desired (e.g., specified) target interface-counter polling frequency comprises selecting a first number of commands and/or command batches and determining, e.g., by performing interface polling using the first number of commands and/or command batches, whether data loss from overwriting (e.g., as described herein) occurs. For example, if such data loss occurs with a first number of commands and command batches being 20 and 1, respectively, for a target interface-counter polling period of 5 ms, then the first number of commands and command batches may be altered. For instance, a second number of commands and command batches may be selected, e.g., to be 10 and 2, respectively, for the target interface-counter polling period of 5 ms. Interface polling using the second number of commands and command batches may be performed to determine whether data loss from overwriting (e.g., as described herein) occurs. An additional iteration, e.g., based on a third number of commands and/or command batches, may be performed, and so on or so forth. A process, routine, reference data set, user input, algorithm (e.g., machine learning algorithm), model (i.e., artificial neural network), and/or other means (e.g., including or based on technologies or applications known or apparent from a reading of this description, including modifications or extensions thereof) may be used to determine the number n of command batches based on the interface-counter target polling frequency.

Techniques and systems for generating, e.g., accessing, building, modifying, and/or developing, command batches to facilitate execution of throughput-counter polling commands corresponding to a target interface-counter polling frequency, without loss of data (execution results) from early overwriting, may be based on technologies or applications known or apparent from a reading of this description, including modifications or extensions thereof. For example, such technologies or applications may pertain to the fields of polling techniques or code generation. Further, in one or more implementations, determining a number and/or type of throughput-counter polling command and/or of command batches may include an iterative (e.g., trial and error; cf. above) process. In an example, if a determined number n of command batches results in data loss from overwriting, the number n of command batches may be increased, e.g., incremented by one. A determination may then be made as to whether data loss from overwriting (as described herein) occurs or is likely to occur based on the incrementation, and so on or so forth.

Following or concurrently with identification of the throughput-counter polling commands and/or command batches, n command batches may be generated. For instance, when the number n of command batches is 2, at least first and second command batches are generated (Operation 206). Generating the throughput-counter polling commands and/or command batches may include selecting a network management or monitoring tool. Generating the throughput-counter polling commands and/or command batches may include utilizing the network management or monitoring tool, e.g., at or comprising the event handler 102, to collect statistics and data from one or more network interfaces. The one or more network interfaces may be associated with, included in, or adjacent to one or more corresponding network devices, e.g., routers, switches, firewalls, address translators, or servers.

The specific commands (e.g., throughput-counter polling commands), command batches, and/or batch-processing information (e.g., command-batch indicators) are in typical implementations generated based on identifying monitoring properties associated with, for example, one or more of a particular network infrastructure, a network device, and the network management or monitoring tool. Additionally or alternatively, the monitoring properties may be associated with data port particulars associated with setting-up and monitoring, e.g., via corresponding data-throughput counters, the network management or monitoring tool and corresponding network device(s).

Setting up the network management or monitoring tool and corresponding network device(s) may comprise determining one or more of IP address(es), hostname(s), login credential(s), and type(s) of network interfaces to be monitored. In typical implementations, the network interface(s) may comprise one or more of an Ethernet interface, a local area network interface, a virtual network interface, and a loopback interface. Additionally or alternatively, the setting-up may be based on one or more of a simple network management protocol (SNMP), a command line interface (CLI) script, a Nagios opensource network monitoring tool, a PRTG network monitoring software, or a Zabbix open-source software tool.

Additionally or alternatively, generating the at least first and second command batches may correspond to or may comprise generating at least first and second scripts, e.g., configured to provide in whole or in part, the functionality of the at least first and second command batches. The at least first and second scripts may include the same, substantially the same, or substantially similar content indicating the same set of throughput-counter polling commands. In an example operation, n scripts, of a plurality of scripts, may be generated where each of the n scripts includes a same set of throughput-counter polling commands. Any portion of the commands (e.g., throughput-counter polling commands), command batches, or batch-processing information may in typical implementations be based on, associated with, or comprise at least part of any of the information in or referenced by the data repository 116, such as the batch number information 138 or the throughput-counter polling command information 140.

Following creation of the at least first and second command batches, information associated, corresponding to, or comprising the at least the first and second command batches may be stored at the DMA memory module 112 (Operation 208). For instance, the number n of command batches may be stored in respective regions or locations of the DMA memory module 112. In an example implementation, the first command batch 118 and the second command batch 120 may be stored, e.g., in the first DMA memory, of the DMA memory module 112. In a particular implementation, the first command batch 118 and the second command batch 120 are stored at addresses, in the DMA memory module 112, that are indicated by the batch-processing information, e.g., written to the command ring 114. Writing at least part of the commands (e.g., throughput-counter polling commands), command batches, or batch-processing information, in typical implementations is performed based on, in association with, or using at least part any of the techniques described or referenced herein, e.g., in connection with the first command batch 118, the second command batch, the DMA memory module 112, and/or the data repository 116.

At Operation 210, at least the first and second batch-execution instructions are enqueued into a memory, queue, or buffer such as a circular buffer, e.g., the command ring 114, for processing, e.g., at the switch chip 108. In one or more implementations, batch-processing information associated with, e.g., pointing to, referencing, or identifying, the created command batches, e.g., the first command batch 118 and the second command batch 120, is written to the command ring 114 for execution at the hardware accelerator 128, e.g., in a round-robin fashion. The batch-processing information may comprise, for example, command-batch indicators as described herein. One or more of the command-batch indicators may include one or more addresses pointing to a corresponding one or more of the created command batches in the DMA memory region 112. For example, a first command-batch indicator may indicate a first address in the DMA memory region 112 corresponding to the first command batch 118, and a second command-batch indicator may indicate a second address in the DMA memory region 112 corresponding to the second command batch 120.

According to one or more implementations, Operation 210 comprises enqueuing n batch-execution instructions, pointing to or indicating a corresponding n command batches at the DNA memory module 112, to the command ring 114. Each of the n command batches may include the same set of throughput-counter polling commands. Additionally or alternatively, enqueuing the batch processing information, e.g., batch-execution instructions, to the command ring 114 may comprise setting the START bit, e.g., in the COMMAND register associated with the event handler 102 and/or the switch chip 108. For example, the START bit may indicate, to the switch chip 108 that the n command batches are available at the DMA memory module 112 for execution, e.g., in a round robin pattern. Processing the n command batches in a round robin pattern may correspond to (e.g., produce during the high-speed polling, be observed during the high-speed polling, and/or result from the high-speed polling) a period of time between executions of a set of throughput-counter polling commands, e.g., of a same command batch, and/or may facilitate an overall and/or target interface-counter polling frequency.

Subsequently, command batches indicated by the batch-execution instructions at the command ring 114 are executed at the switch chip 108, e.g., at the chip engine 108. Executing the command batches operates to poll counter registers, corresponding to one or more data-throughput counters, at the interface-counter polling frequency. A set of the command batches, e.g., indicated by the batch-execution instructions at the command ring 114, may be executed, e.g., periodically, to poll a corresponding set of the counter registers 132 at the interface-counter polling frequency. Command-batch execution results from the executing are stored at a results storage region, e.g., without data loss from overwriting prior command-batch execution results from the executing already stored at the results storage region.

Based on these executions, e.g., of the first and second command batches, first and second notifications may be received at the event handler 102 regarding a status of the executions (Operation 212). In one or more implementations, the first and second notifications are received, e.g., via the switch chip 108 in connection with the batch-execution instructions, e.g., responsive to the first and second batch-execution instructions, indicating that results from executing the first and second command batches are stored at the first and second DMA regions, respectively. According to an example implementation, a DONE bit is set, e.g., in a STATUS register associated with the event handler 102 and/or the switch chip 108. The DONE bit may be configured to indicate, e.g., to the event handler 102, that command-batch execution results are available at the second DMA memory of the DMA memory module 112, e.g., for reading and processing by the event handler 102.

In certain implementations, the event handler and/or switch chip 108 is configured to store and/or access instructions embodied on one or more non-transitory media and comprises or is configured to use one or more processors to execute the instructions to cause performance of a multiple operations corresponding to one or more of the above-referenced Operations 202-212. The multiple operations may comprise determining a number of first-port polling commands, e.g., of identical first-port polling commands, that can be executed at a network interface device, e.g., switch chip, without loss of data from overwriting of execution results generated from the executing. The multiple operations may further comprise transmitting the commands in one or more batches to a region for execution and reading a plurality of results corresponding in number to the number of commands. The transmitting may comprise sending a plurality of batches, each including a copy of the commands, for execution by the network interface device, and the determining may include identifying a rate at which batches of the plurality of batches can be sent for execution by the network interface device without the loss of data from overwriting.

Additionally or alternatively, the determining may include identifying a rate at which one or more batches, each including a copy of the commands, can be sent for execution by the network interface device to achieve an identified polling rate, of polling one or more counter registers at the network interface device, without the loss of data from overwriting. The determining may include identifying a polling interval corresponding to a rate at which a set, including copies of the batch, is to be sent for execution by the network interface device, and based on the polling interval identifying a number of the copies of the batch to be included in the set. The determining may include identifying a polling interval and a number of the commands to be transmitted during each polling interval, and/or selecting a number of batches, each including a copy of a subset of the commands, to transmit during each polling interval to avoid the loss of data from overwriting.

The determining may include applying information, associated with the commands, to a trained machine learning algorithm to predict whether the transmitting will cause the loss of data from overwriting. Additionally or alternatively, the determining may include training a machine learning algorithm based on instances of information corresponding to transmissions of counter register polling commands in command batches to network interface devices and/or based further on results from the transmissions including whether result loss of data from overwriting is detected. In certain embodiments of the disclosure, the determining may include applying, to a trained machine learning algorithm, information corresponding to transmission of a number of the batches for execution by the network interface device. The applying may be used to determine whether the loss of data from overwriting is detected; and/or in response to detecting the loss of data from overwriting, increasing the number of batches. Additionally or alternatively, the determining may include training and applying a machine learning algorithm based on instances of information corresponding to transmission of a number of the batches for execution by the network interface device. The instances may indicate one or both of the first time-duration and the second time-duration. based further on results from the transmissions including whether result loss of data from overwriting is detected.

The multiple operations may comprise, e.g., as part of the determining, identifying a first number of batches, each including a copy of the commands, to be sent during a first operating condition corresponding to a first rate of polling one or more counter registers associated with the network interface device. In example implementations, the multiple operations may further comprise, e.g., as part of the determining, identifying a second number of the batches to be sent during a second operating condition corresponding to a second rate of polling the one or more counter registers, where the second number and the second rate are greater than the first number and the first rate, respectively.

In certain embodiments, executing each of the commands includes reading a count value that is (a) generated at one or more counter registers of the network interface device, (b) stored in a first memory, e.g., chip storage, and (c) indicative of a number of data packets that have passed through the one or more counter registers at a particular time corresponding to a time that the count value is generated. The results may be read from a second memory, e.g., DMA memory, that differs from the first memory. The multiple operations may further comprise creating the batch that includes the read-write commands.

In one or more embodiments, the created batch that includes the read-write commands may specify a first command memory and a first results memory. The multiple operations may further comprise: prior to completion of the reading, creating a second batch corresponding in structure to the batch, the second batch specifying a second command memory different from the first command memory and/or specifying a second results memory different from the first results memory. In certain embodiments, the multiple operations further comprise: prior to completion of the reading, transmitting (e.g., queueing) the second batch for execution by a co-processor at the network interface device. In embodiments, the multiple operations further comprise determining a data-packet traffic rate, of the data packets through one or more ports of the network interface device, based on performing a subtraction operation on at least two of the count values generated via the execution of the batch by the co-processor.

In an example network interface device, such as the switch chip 108, execution of each batch may begin with a first reading of a hardware timestamp and end with second reading of the hardware timestamp. The subtraction operation may be performed on at least one of: (a) the first hardware timestamp of a first batch and the second hardware timestamp of the first batch to determine a first time-duration of execution for the first batch and (b) the second hardware timestamp of the first batch and a first hardware timestamp of a second batch to determine a second time-duration between execution of the first batch and the second batch.

In accordance with certain implementations of the disclosure, the multiple operations may further comprise prior to the transmitting, monitoring for an event while polling one or more counter registers of the network interface device at a first monitoring rate. According to one or more embodiments, the multiple operations may further comprise identifying an occurrence of the event based on the monitoring. The multiple operations may further comprise in response to the identifying, adjusting the monitoring rate. In some embodiments, adjusting the monitoring rate may comprise increasing the monitoring rate. The event may comprise one or more of a time of day, a threshold rate of data-packet traffic flow through one or more counter registers of the network interface device, a threshold change in the rate of data-packet traffic flow, a detected trend associated with the data-packet traffic flow, a link-flapping metric, and a packet-drop rate. Polling of a set of data-throughput counters, e.g., of the one or more counter registers, may be triggered in response to determining that (i) a packet drop rate meets a first polling initiation criterion, (ii) a time of day, a day of week, or date meets a second polling initiation criterion, (iii) detected link flapping characteristics meet a third polling initiation criterion, and/or (iv) a detected quality of service meets a fourth polling initiation criterion.

4. EXAMPLE EMBODIMENT

A detailed example embodiment is described below for purposes of clarity. Components and/or operations described below should be understood as specific examples that may not be applicable to certain embodiments. Accordingly, components and/or operations described below should not be construed as limiting the scope of any of the claims.

In accordance with one or more aspects of the disclosure, the number n of command batches, e.g., corresponding to the batch number information 138, is determined or adjusted. The number n of command batches may be determined or adjusted, e.g., at Operation 204, based on an amount of time for a single execution of a set of throughput-counter polling commands, e.g., corresponding to the throughput-counter polling command information 140. The single execution may correspond to, e.g., define or indicate, a single instance of polling one or more of the counter registers 132.

The amount or amounts of time may be detected, for example, by including timestamp read commands (e.g., hardware timestamp commands) in or in association with the command batches. For instance, each of the at least first and second command batches may include content indicating an initial command to read a timestamp and a final command to read the timestamp. Hence, the amount of time for the single execution of the set of throughput-counter polling commands may be determined by or based on at least: obtaining a first or initial timestamp corresponding to execution of a throughput-counter polling command in the set of throughput-counter polling commands. Additionally or alternatively, the amount of time for the single execution of the set of throughput-counter polling commands may be determined by or based on at least: obtaining a particular timestamp corresponding to execution of a particular throughput-counter polling command in the set of throughput-counter polling commands.

The first or initial timestamp and the particular timestamp may correspond to or comprise a first hardware timestamp and a second hardware timestamp, respectively. Additionally or alternatively, the throughput-counter polling command and the particular throughput-counter polling command may correspond to or comprise a chronologically first throughput-counter polling command in the set of throughput-counter polling commands and a chronologically last throughput-counter polling commands in the set of throughput-counter polling commands, respectively.

In one or more embodiments of the disclosure, the first timestamp (e.g., first hardware timestamp) and the second timestamp (e.g., second hardware timestamp) may each be determined by the chip engine 126 in association with, e.g., during, processing or execution of the set of throughput-counter polling commands. According to the one or more embodiments, an amount of time for the single execution of the set of throughput-counter polling commands may be determined based on the first or initial timestamp and the particular timestamp. For example, the amount of time may be determined by calculating, at the chip engine 126, a difference in time between the first hardware timestamp and the second hardware timestamp. For instance, determining the amount of time may comprise obtaining first and second hardware timestamps corresponding to execution of initial and final throughput-counter polling commands of the set of throughput-counter polling commands, respectively. Additionally or alternatively, determining the amount of time may comprise computing the amount of time for the single execution of the set of throughput-counter polling commands based on a difference in time between the first and second hardware timestamps.

According to one or more embodiments of the disclosure, the number n of command batches (e.g., corresponding to the batch number information 138), is determined or adjusted, for example, based on an amount of time between executions of a pair of command batches. For example, the number n of command batches may be determined or adjusted based on a timestamp associated with processing of a last or final (executed) command of a first command batch and based on another timestamp associated with processing of a first or initial (executed) command of a second command batch. In a particular implementation, determining or adjusting the number n of command batches may comprise comparing, e.g., calculating a time difference between (i) a first result obtained from executing a last command of a first-command-batch execution, instructing a timestamp read, and (ii) a second result obtained from executing a first command of a next-command-batch execution, instructing a timestamp read.

In another implementation, determining or adjusting the number n of command batches may comprise determining a temporal quantity, e.g., difference, between (i) ending execution of a first command batch and (ii) beginning execution of a next command batch. For instance, the first command batch may include a sequence of commands beginning with a first timestamp read command and ending with a second timestamp read command, and the second command-batch may include a sequence of commands beginning with an initial timestamp read command and ending with a final timestamp read command. In an example implementation, ending execution of the first command batch may correspond to executing the second timestamp read command and beginning execution of the next command batch may correspond to executing the initial timestamp read command.

In one or more embodiments of the disclosure, the second command batch may include a set of commands that is the same as or that includes a set of command included in the first command batch. For example, the second command batch may consist essentially of a set of commands that is the same as or that includes a set of commands forming or corresponding to the first command batch. In a particular implementation, each of the first command batch and the second command batch may comprise or consist essentially of the same or substantially the same commands. According to a feature of the disclosure, the first and last command within each of a set of polling command batches executed consecutively includes an instruction to read/retrieve a hardware timestamp directly from the switch chip 108. This hardware timestamp retrieval mechanism may provide the process execution module 110 with precise time information concerning when a corresponding set of count values were obtained from the counter registers 132 at the switch chip 108. Consequently, implementation of the hardware timestamp retrieval mechanism may afford or provide a user, e.g., at the process execution module 110, with a comprehensive understanding of the duration associated with, e.g., taken for, the execution of each command batch on the switch chip 108. Additionally or alternatively, implementation of the hardware timestamp retrieval mechanism may afford or provide a user, e.g., at the process execution module 110, with a comprehensive understanding of the precise time intervals between successive command batch executions.

Turning to FIG. 3A, an example embodiment 300 is depicted in the form of a group of registers corresponding for instance to a group of the counter registers 132. As illustrated in the figure, the group of registers includes register A, register B, register C, and register D, each of which may be included at the chip storage 130 of the switch chip 108. Each of register A, register B, register C, and register D may operate as one of the counter registers 132. In accordance with an aspect of the disclosure, register A may be configured to store count values collected from a first data port at a network interface, register B may be configured to store count values collected from a second data port at the network interface, register C may be configured to store count values collected at a third data port at the network interface, and register D may be configured to store count values collected at a fourth data port at the network interface.

The example embodiment 300 shows, in a top row of the figure, a content (e.g., count value or counted value) stored in register A at a first time T1, at a second time T2, and at a third time T3. In a particular implementation, the top row shows a first counted value corresponding to a first polling (read) of register A at the first time T1, a second counted value corresponding to a second polling of register A at the second time T2, and a third counted value corresponding to a third polling of register A at the third time T3. Similarly, the second, third, and fourth rows in the figure may correspond to contents of register B, register C, and register D at the first time T1, the second time T2, and the third time T3.

A count value collected from register A (e.g., as a consequence of executing the first throughput-counter polling command) at a polling time corresponding to the first time T1 may correspond to the register A first counted value, and a count value collected from register B (e.g., as a consequence of executing the second throughput-counter polling command) at a polling time corresponding to the first time T1 may correspond to the register B first counted value. Similarly, a count value collected from register C (e.g., as a consequence of executing the third throughput-counter polling command) at a polling time corresponding to the first time T1 may correspond to the register C first counted value, and so on or so forth. Similarly, count values collected from registers A through D based on executing the first through fourth throughput-counter polling commands at polling times corresponding to the second time T2 may correspond to the register A second counted value through the register D second counted value, respectively. Similarly, or by extension, the four count values collected from the four registers based on executing the four throughput-counter polling commands at polling times corresponding to the third time T3 may correspond to the register A third counted value through the register D third counted value, respectively.

According to one or more aspects of the disclosure, the counted values are read from register A, register B, register C, and register D based on, e.g., in response to, one or more executions of a corresponding one or more command batches. In an example implementation, a first command batch may include first, second, third, and fourth throughput-counter polling commands configured to read register A, register B, register C, and register D, respectively. Further, the first command batch may include a hardware timestamp read command, e.g., as a fifth command, e.g., to be executed immediately before or after (e.g., after) the four throughput-counter polling commands. Hence, executing the first command batch may generate, inter alia, the register A first counted value, the register B first counted value, the register C first counted value, the register D first counted value, and a value corresponding to a reading of the hardware timestamp at the first time T1 (e.g., corresponding to a time during execution of the first command batch).

In one or more embodiments, another instance of the first command batch, e.g., the same as or a copy of the first command batch, may include the first, second, third, and fourth throughput-counter polling commands and a hardware timestamp read command, e.g., as a fifth command, e.g., to be executed immediately before or after (e.g., before) the four throughput-counter polling commands. Hence, execution corresponding to the other instance of the first command batch may generate, inter alia, the register A second counted value, the register B second counted value, the register C second counted value, the register D second counted value, and a value corresponding to a reading of the hardware timestamp at the second time T2 (e.g., corresponding to a time of execution of the other instance of the first command batch).

Rates of change for counted values collected from the registers may be calculated based on determined differences in counted values collected from the registers and differences in times at which the counted values are collected. For a particular register of the registers A-D, a rate of change in counted values at the particular register may be computed, e.g., at the process execution module 110 and/or the event handler 102, based on a pair of counted values and a pair of corresponding count-collection times for the pair of counted values. In accordance with one or more embodiments, the rate of change in counted values at one or more of the registers may be computed and/or interpreted as corresponding to a particular rate of data-packet flow through a corresponding one or more data ports at one or more network interfaces being monitored. In an example implementation, a rate of change corresponding to a rate of data-packet flow may be calculated based on the counted values collected from the corresponding counter register 132 at the switch chip 108 and based on the timestamps read from the switch chip 108.

Following execution of the first command batch and execution of another instance of the first command batch, e.g., the same as or a copy of the first command batch, four count-value differences, e.g., during a corresponding and/or target time interval, can be determined based on a difference between the second counted values collected from the four registers and the first counted values collected from the four registers. The time interval corresponding to the four count-value differences, e.g., time period A, can be determined based on a difference between the second time T2 and the first T1. In accordance with an aspect of the disclosure, an accumulated count value for each of the four registers during a time interval corresponding to a sum of time period A and the time period B can be determined based on a difference between (a) counted values from the registers collected at time period T3 and (b) counted values from the registers collected at time period T1.

In other words, a number of data packets transmitted/received at a data port corresponding to register D during time period A may be determined, e.g., automatically, at the process execution module 110, by subtracting the register D first counted value from the register D second counted value. Similarly, a number of data packets transmitted/received at an interface during the time period B may be determined by subtracting the counter values detected at T3 from the counter values detected at time T2.

In accordance with an aspect of the disclosure, the register A second counted value (i) may represent a cumulative count tracked by register A from the first time T1 to the second time T2 at which the register A second counted value is read and (ii) may be determined via execution of an instance of the first command batch, e.g., comprising a set of commands. The register A third counted value (i) may represent another cumulative count tracked by register A from the first time T1 to the third time T3 at which the register A third counted value is read and (ii) may be determined via execution of another instance of the first command batch, e.g., comprising the set of commands. As indicated in the figure, the third time T3 occurs subsequent to the second time T2. A cumulative delta, e.g., corresponding to a time period from the second time T2 to the third time T3, may be determined based on a difference between the register A third counted value and the register A second counted value. In accordance with one or more embodiments, the cumulative delta may be stored, e.g., at the DMA memory module 112 and/or at a storage drive or disk accessible by the event handler 102, without storing the register A second counted value. Hence, by virtue of the cumulative delta aspect described herein, certain implementations of the disclosure may only store deltas over certain periods of time, as opposed to storing absolute values at every timepoint, to thereby conserve one or both of processing resources and a memory footprint.

Figure 3B:
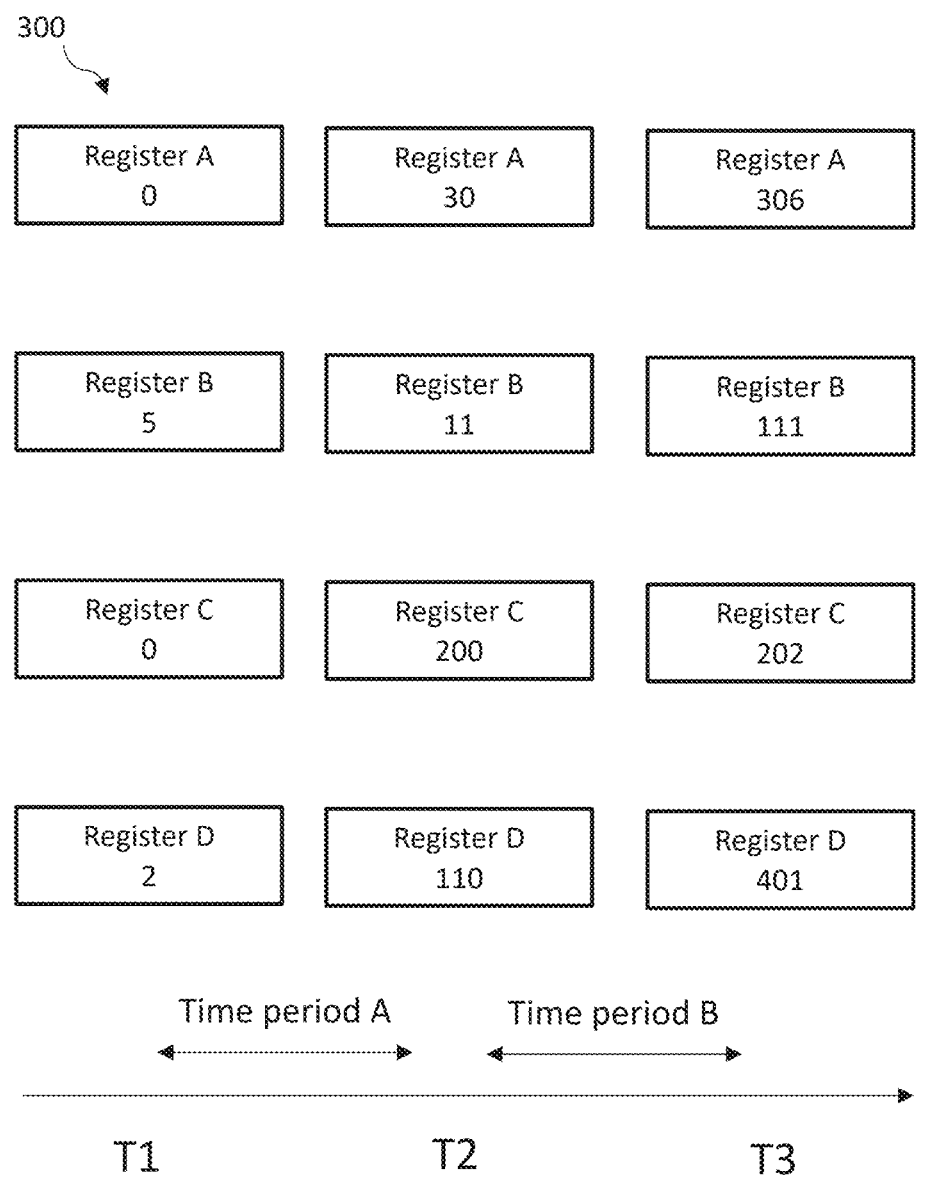

FIG. 3B illustrated the example embodiment 300 with particular values stored in the group of registers. As elucidated in the figure, register A, register B, register C, and register D may be associated with, e.g., contain, first numerical values, e.g., count values, corresponding to 0, 5, 0, and 2, respectively, at the first time T1. These hypothetical first values may correspond to count values collected from registers A-D, e.g., as a consequence of executing the four throughput-counter polling commands, at a polling time associated with the first time T1. Similarly, registers A-D may include second numerical values corresponding to 30, 11, 200, and 110, respectively, at the second time T2. The hypothetical second values may correspond to count values collected from registers A-D, e.g., as a consequence of executing the four throughput-counter polling commands, at a polling time associated with the second time T2. Further, registers A-D may comprise third numerical values corresponding to 306, 111, 202, and 401, respectively, at the third time T3. The hypothetical third values may correspond to count values collected from registers A-D, e.g., as a consequence of executing the four throughput-counter polling commands, at a polling time associated with the third time T3.

In the example implementation, executing the first command batch may generate the first counted values of 0, 5, 0, and 2 along with a first time value corresponding to a reading of the hardware timestamp at the first time T1, e.g., corresponding to a hypothetical time of 0 ms. An execution corresponding to the other instance of the first command batch may generate the second counted values of 30, 11, 200, and 110 along with a second time value corresponding to a reading of the hardware timestamp at the second time T2, e.g., corresponding to a hypothetical time of 10 ms. Similarly, executing a further instance of the first command batch may generate the third counted values of 306, 111, 202, and 401 along with a third time value corresponding to a reading of the hardware timestamp at the third time T3, e.g., corresponding to a hypothetical time of 20 ms. In an alternative example implementation, T1, T2, and T3, may correspond to hypothetical times of 1 ms, 2 ms, and 3 ms, respectively.

The four count-value differences, e.g., determined based on differences between the second counted values (30, 11, 200, and 110) and the first counted values (0, 5, 0, and 2), respectively, are 30, 6, 200 and 108. The time interval corresponding to these four count-value differences, e.g., time period A, determined based on a difference between the second time T2 (10 ms) and the first T1 (0 ms) is 10 ms (or is 1 ms in the alternative example implementation). The accumulated count values for the four registers, determined based on a sum of time periods A and B (20 ms) and based on a difference between the third counted values (306, 111, 202, and 401) and the first counted values of (0, 5, 0, and 2), are 306, 106, 202, and 399. Hence, the above-referenced rate of data-packet flow may be calculated based on the counted values and the time period A.

5. HARDWARE OVERVIEW

According to one embodiment of the disclosure, the techniques described herein are implemented by one or more special-purpose computing devices. The special-purpose computing devices may be hard-wired to perform the techniques, or may include: (i) digital electronic devices such as one or more application-specific integrated circuits (ASICs), field programmable gate arrays (FPGAs), or network processing units (NPUs) that are persistently programmed to perform the techniques, or (ii) one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
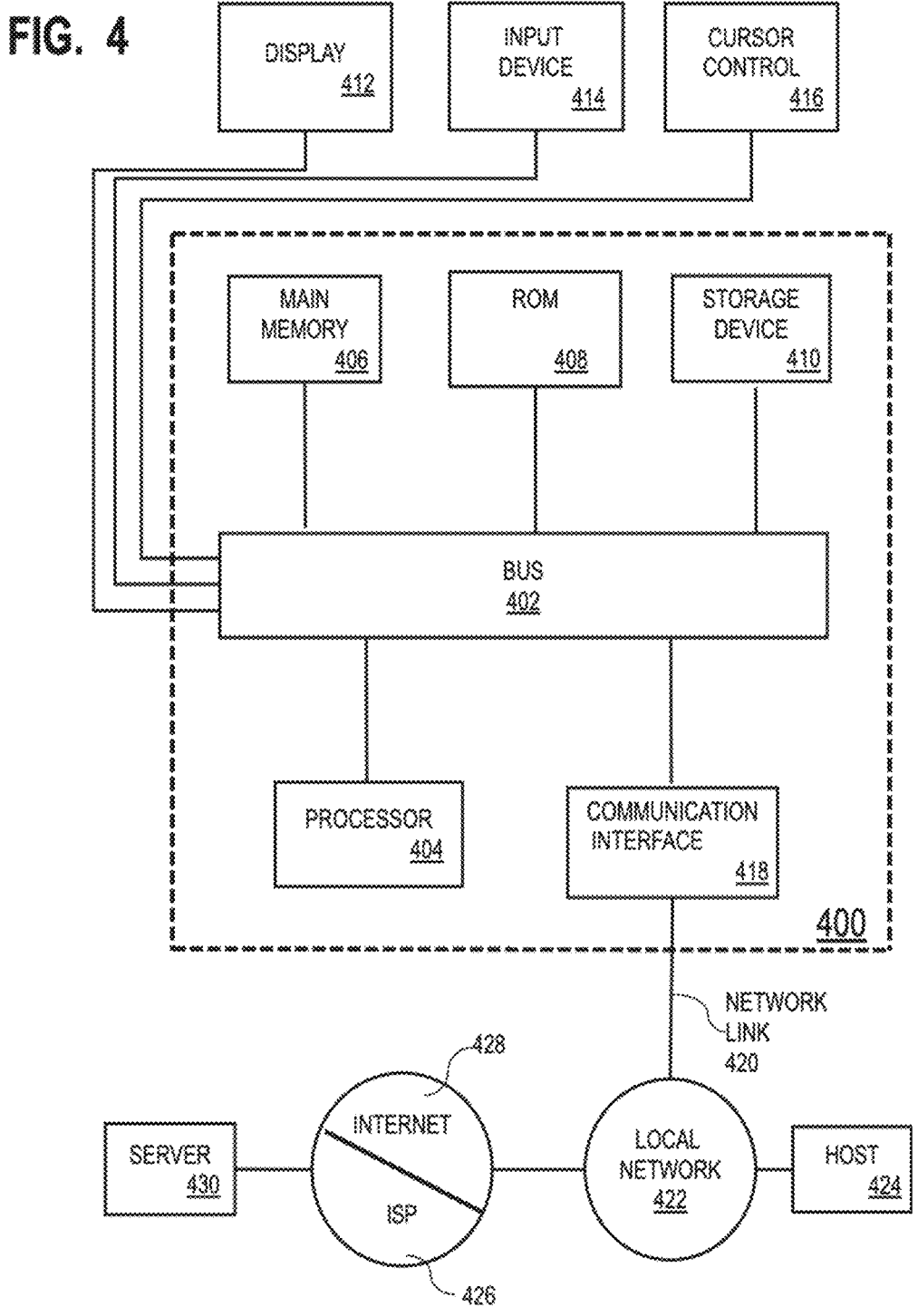
FIG. 4 illustrates a block diagram that includes a computer system in accordance with one or more embodiments of the disclosure.

For example, FIG. 4 is a block diagram illustrating the computer system 400 upon that an embodiment of the disclosure may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410 is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, an axis (e.g., x) and another axis (e.g., y), that allows the device to specify positions in a plane.

Computer system 400 may implement the techniques described herein using customized hard-wired logic, one or more ASICs or FPGAs, firmware and/or program logic that in combination with the computer system causes or programs computer system 400 to be a special-purpose machine. According to one embodiment of the disclosure, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process operations described herein. In alternative embodiments of the disclosure, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410.

Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, that carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

6. MISCELLANEOUS; EXTENSIONS

Unless otherwise defined, all terms (including technical and scientific terms) are to be given their ordinary and customary meaning to a person of ordinary skill in the art, and are not to be limited to a special or customized meaning unless expressly so defined herein.

This application includes references to certain trademarks. Although the use of trademarks is permissible in patent applications, the proprietary nature of the marks should be respected and every effort made to prevent their use in any manner that might adversely affect their validity as trademarks.

Embodiments are directed to a system that may include or operate with a computer network and include one or more devices, e.g., a hardware processor, that are configured to perform any of the operations described herein and/or recited in any of the claims below.

In an embodiment of the disclosure, one or more non-transitory computer readable storage media comprise instructions that, when executed by one or more hardware processors, cause performance of any of the operations described herein and/or recited in any of the claims.

Any combination of the features and functionalities described herein may be used in accordance with one or more embodiments of the disclosure. In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicant to be the scope of the disclosure, is the literal and equivalent scope of the set of claims that issue from this application, in the specific form in which such claims issue, including any subsequent correction.

What is claimed is:

1. One or more non-transitory computer readable media having instructions which, when executed by one or more hardware processors, cause the one or more hardware processors to facilitate a plurality of operations, the operations comprising:

identifying a target polling frequency for polling a set of counters associated with at least one switch device by executing a set of commands, via the at least one switch device, for each polling instance, the set of counters comprising one or more counters;

determining a number of commands to include in a set of command batches for periodic execution, via the at least one switch device, of the set of commands, the set of command batches comprising one or more command batches;

generating the set of command batches that each include the set of commands, the set of command batches comprising at least one command batch that includes (a) a first hardware timestamp read command, (b) a set of interface polling commands, and (c) a second hardware timestamp read command; and in response to detecting a triggering event, causing execution of the set of command batches, wherein each command batch of the set of command batches is executed periodically at a respective frequency to poll the set of counters, and wherein the triggering event is selected from a group comprising at least a packet drop rate meeting a first polling initiation criterion, a time of day, a day of week, or a date meeting a second polling initiation criterion, a set of link flapping characteristics meeting a third polling initiation criterion, and a detected quality of service meeting a fourth polling initiation criterion.

2. The one or more non-transitory computer readable media of claim 1, wherein the number of commands is determined based at least in part on a number of counters in the set of counters, and wherein the at least one command batch is associated with a memory region such that an output generated via execution of the set of commands in the at least one command batch is stored in the memory region.

3. The one or more non-transitory computer readable media of claim 1, wherein the at least one switch device is configured to operate with an associated memory region such that an output generated via execution of the set of commands in the at least one command batch is stored in the memory region associated with the at least one switch device.

4. The one or more non-transitory computer readable media of claim 1, wherein the set of command batches comprises a plurality of command batches that are each associated with a memory region such that, for each particular command batch in the set of command batches, an output generated via execution of the set of commands in the particular command batch is stored in a respective memory region associated with the particular command batch.

5. The one or more non-transitory computer readable media of claim 1, wherein the at least one switch device comprises a set of switch devices configured to operate with a corresponding set of memory regions in an associated memory such that, for a switch device in the set of switch devices, an output generated via execution of the set of commands in the at least one command batch is stored in a corresponding memory region in the memory.

6. The one or more non-transitory computer readable media of claim 1, wherein the at least one switch device comprises a plurality of switch devices that are each configured to operate with a respective memory region in an associated memory such that, for a particular switch device of the plurality of switch devices, an output generated via execution of the set of commands in the at least one command batch is stored in the respective memory region corresponding to the particular switch device.

7. The one or more non-transitory computer readable media of claim 1, wherein execution of the set of commands comprised in each particular command batch, of the set of command batches, at the respective frequency results in the set of commands being executed at the target polling frequency for polling the set of counters.

8. The one or more non-transitory computer readable media of claim 1, wherein a number of command batches in the set of command batches is determined or adjusted based on an amount of time for a single execution of the set of commands.

9. The one or more non-transitory computer readable media of claim 8, wherein the amount of time for the single execution of the set of commands is determined at least by:

determining a first timestamp corresponding to execution of a chronologically first command in the set of commands;

determining a second timestamp corresponding to execution of a chronologically last command in the set of commands; and computing the amount of time for the single execution of the set of commands based on a difference in time between the first timestamp and the second timestamp.

10. The one or more non-transitory computer readable media of claim 1, wherein the operations further comprise:

reading a first value from a first counter by executing a first command batch comprising the set of commands, wherein the first value represents a first cumulative count tracked by the first counter from a first time to a second time at which the first value was read;

reading a second value from the first counter by executing a second command batch comprising the set of commands, wherein the second value represents a second cumulative count tracked by the first counter from the first time to a third time at which the second value was read, wherein the third time is subsequent to the second time;

determining a cumulative delta, corresponding to a time period from the second time to the third time, based on a difference between the second value and the first value; and storing the cumulative delta without storing the second value.

11. The one or more non-transitory computer readable media of claim 1, wherein execution of a first command batch of the set of command batches is initiated at a different time than execution of a second command batch of the set of command batches.

12. The one or more non-transitory computer readable media of claim 1, wherein the switch device comprises a networking device, and wherein at least one of the set of counters is used for counting a number of packets that have been transmitted by and/or received by a particular physical port on the switch device.

13. A method, comprising:

accessing a target polling frequency for polling a set of counters associated with at least one switch device by executing a set of commands, via the at least one switch device, for each polling instance, the set of counters comprising one or more counters;

determining a number of commands to include in a set of command batches for periodic execution, via the at least one switch device, of the set of commands, the set of command batches comprising one or more command batches;

generating the set of command batches that each include the set of commands, the set of command batches comprising at least one command batch that includes (a) a first hardware timestamp read command, (b) a set of interface polling commands, and (c) a second hardware timestamp read command; and in response to detecting a triggering event, causing execution of the set of command batches, wherein each command batch of the set of command batches is executed periodically at a respective frequency to poll the set of counters, and wherein the triggering event is selected from a group comprising at least a packet drop rate meeting a first polling initiation criterion, a time of day, a day of week, or a date meeting a second polling initiation criterion, a set of link flapping characteristics meeting a third polling initiation criterion, and a detected quality of service meeting a fourth polling initiation criterion.

14. The method of claim 13, wherein the at least one switch device is configured to operate with an associated memory region such that an output generated via execution of the set of commands in the at least one command batch is stored in the memory region associated with the at least one switch device.

15. The method of claim 13, wherein the set of command batches comprises a plurality of command batches that are each associated with a memory region such that, for each particular command batch in the set of command batches, an output generated via execution of the set of commands in the particular command batch is stored in a respective memory region associated with the particular command batch.

16. The method of claim 13, wherein the at least one switch device comprises a set of switch devices configured to operate with a corresponding set of memory regions in an associated memory such that, for a switch device in the set of switch devices, an output generated via execution of the set of commands in the at least one command batch is stored in a corresponding memory region in the memory.

17. A system having one or more processors configured to cause a plurality of operations, the operations comprising:

determining a number of commands to include in a set of command batches for periodic execution, via at least one switch device associated with a set of counters, of a set of commands, wherein (a) the set of command batches comprises one or more command batches, (b) the set of counters is configured to be accessed at a target polling frequency via execution of the set of commands, by the at least one switch device, for each polling instance, and (c) the set of counters comprises one or more counters;

generating the set of command batches that each include the set of commands, the set of command batches comprising at least one command batch that includes (a) a first hardware timestamp read command, (b) a set of interface polling commands, and (c) a second hardware timestamp read command; and in response to detecting a triggering event, causing execution of the set of command batches, wherein each command batch of the set of command batches is executed periodically at a respective frequency to poll the set of counters, and wherein the triggering event is selected from a group comprising at least a packet drop rate meeting a first polling initiation criterion, a time of day, a day of week, or a date meeting a second polling initiation criterion, a set of link flapping characteristics meeting a third polling initiation criterion, and a detected quality of service meeting a fourth polling initiation criterion.

18. The system of claim 17, wherein the at least one switch device comprises a plurality of switch devices that are each configured to operate with a respective memory region in an associated memory such that, for a particular switch device of the plurality of switch devices, an output generated via execution of the set of commands in the at least one command batch is stored in the respective memory region corresponding to the particular switch device.

19. The system of claim 17, wherein execution of the set of commands comprised in each particular command batch, of the set of command batches, at the respective frequency results in the set of commands being executed at the target polling frequency for polling the set of counters.

20. The system of claim 17, wherein a number of command batches in the set of command batches is determined or adjusted based on an amount of time for a single execution of the set of commands.

* * * * *